United States Patent
Souvanny

(10) Patent No.: US 8,414,006 B2
(45) Date of Patent: Apr. 9, 2013

(54) BICYCLE DEVICE WITH DIRECT DRIVE TRANSMISSION AND HUBLESS WHEELS

(76) Inventor: Nanh Souvanny, Sacramento, CA (US)

( * ) Notice: Subject to any disclaimer, the term of this patent is extended or adjusted under 35 U.S.C. 154(b) by 79 days.

(21) Appl. No.: 13/191,435

(22) Filed: Jul. 26, 2011

(65) Prior Publication Data

US 2012/0024613 A1 Feb. 2, 2012

Related U.S. Application Data

(60) Provisional application No. 61/367,905, filed on Jul. 27, 2010.

(51) Int. Cl.
*B62M 1/02* (2006.01)
(52) U.S. Cl.
USPC ............................................. 280/260
(58) Field of Classification Search ............. 280/259, 280/260
See application file for complete search history.

(56) References Cited

U.S. PATENT DOCUMENTS

| | | | | |
|---|---|---|---|---|
| 620,929 | A * | 3/1899 | Jocelyn | 280/238 |
| 668,784 | A * | 2/1901 | Travis | 280/260 |
| 3,861,715 | A | 1/1975 | Mendoza | |
| 5,316,327 | A | 5/1994 | Bell | |
| 5,378,201 | A | 1/1995 | Lee | |
| 5,419,619 | A | 5/1995 | Lew | |
| 5,522,612 | A * | 6/1996 | Considine | 280/260 |
| 6,478,323 | B2 * | 11/2002 | Chang | 280/260 |
| 6,685,205 | B1 * | 2/2004 | Weaver et al. | 280/260 |
| 6,878,084 | B2 * | 4/2005 | Hwang | 475/214 |
| 7,148,582 | B2 | 12/2006 | Matsueda | |
| 2006/0175795 | A1 * | 8/2006 | Corson | 280/260 |
| 2009/0062057 | A1 | 3/2009 | Fujiwara | |
| 2011/0062678 | A1 * | 3/2011 | Chen et al. | 280/260 |
| 2012/0186892 | A1 * | 7/2012 | Felsl et al. | 180/220 |

* cited by examiner

*Primary Examiner* — Kevin Hurley
(74) *Attorney, Agent, or Firm* — Daniel Boudwin

(57) ABSTRACT

A bicycle device with an internal drivetrain that eliminates any external mechanical drivetrain components. An internal drive gear is driven by user pedal input, which provides torque and rotation to a plurality of gear rods, connecting rods and disk gears. Gear ratio and speed choice is controlled by the drive gear and a first disk gear, which incorporate a variable gear pitch moving radially outward for which to mate with the gear rods. The drivetrain terminates at a hubless rear wheel, which rotates a tire tread around a stationary hub. Controls for the bicycle are provided in a handle bar stem device that manipulate the position of the gear rods and brake calipers. The front and rear wheel are separable from the central frame of the device for storage and transport. Overall, the present invention provides a sleek, modern upgrade to the traditional bicycle device, and incorporates several features that improve its design.

17 Claims, 6 Drawing Sheets

BICYCLE DEVICE WITH DIRECT DRIVE TRANSMISSION AND HUBLESS WHEELS

CROSS REFERENCE TO RELATED APPLICATION

This application claims the benefit of U.S. Provisional Application No. 61/367,905 filed on Jul. 27, 2010, entitled "Energy Bike."

BACKGROUND OF THE INVENTION

1. Field of the Invention

The present invention relates to bicycle transmissions and drivetrain assemblies. More specifically, the present invention relates to a bicycle with an internal gear set for transmitting user power to a hubless wheel through a drivetrain assembly housed within an interior cavity of the bicycle frame.

2. Description of the Prior Art

Bicycle devices are common transportation and recreational devices utilizing two wheels, a chain and sprocket gearing mechanism, pedal input, steering mechanism and associated controls. These devices are well described in the art, and have undergone considerable changes since their inception. These changes include updates to the bike structure, as well as the mechanical systems that drive the bicycle. These vary from updated materials and frame styles, different tires styles and technology, wheels to accommodate different terrain types, various levels of suspension sophistication, and most relevantly the advances in bicycle transmission mechanisms. Motive power is traditionally transferred via a user-driven crank using foot pedals to power a drive sprocket, which advances a chain linkage secured between the drive sprocket and a rear sprocket. Both sprockets may include concentrically aligned sprockets of differing radius that provide differing speed ratios with regard to the user input and the rear wheel output rotation. The chain is shifted from one sprocket to another to adjust gear ratios for the user, allowing greater torque or higher speeds as required. This type of drive mechanism is a standard assembly for most available bicycles, providing a simple mechanism and method of transferring power and changing gear ratios.

While there are clear benefits derived from this type of mechanism, including simplicity, lightweight and effectiveness. However, there lies room to update this transmission to a more sophisticated and robust means of transferring user-powered rotation to the rear wheel, along with associated gear ratio updating. Common problems associated traditional bicycle transmissions involve the bicycle chain and sprockets. This mechanism is prone to chain slippage or complete dislocation, which disables the vehicle and prevents transference of motive power to the wheel. Another common problem lies in the location of the chain and sprocket assemblies, namely its location exterior of the vehicle frame and in close proximity to a pedaling user. This exposed mounting allows dirt and debris to freely enter the mechanism, increasing maintenance of the system and the susceptibility of the system to foreign object debris and damage. Rocks and dirt can cause the system to lose lubrication and create an interference problem while riding, which endangers the mechanisms and the rider. A further concern is the propensity of the drive gear and chain to snag articles of clothing worn by the rider and cause damage thereto. It is common to see riders hiking up articles of clothing along their legs to prevent such occurrences. The exposed mechanism is also able to fling grease and debris onto the riding user, which can soil his or her clothing during riding.

An update to the traditional bicycle is required, one that addresses the aforementioned drawbacks of the common sprocket and chain mechanism. The present invention provides a fresh update to the bicycle device by providing one that includes a frame having an internal volume, a transmission located therein, incorporation of hubless wheels, and the ability to robustly and quickly adjust gear ratios of said transmission. Further benefits include the ability of the bike wheels to be decoupled from the central frame, and the ability of the forward handle bars to freely rotate about its mounting stem. A handle bar rod mechanism, mounted within the handle bar stem, provides control linkages for all mechanical systems, including gear shifting and brake application.

Several devices are described in the art that employ similar mechanisms or means for delivering power via a direct drive transmission or with a hubless wheel. However, these devices include drawbacks inherent in their design that either limit their use or fail to describe the novelty provided in the present disclosure.

U.S. Pat. No. 5,378,201 to Lee is one such device that describes a transmission assembly for a bicycle that can adjust the torque and velocity through an internal gearing mechanism that requires no variation in sprocket diameter. The device includes a chain drive and a series of gear sets and sprockets to affect quick shifting and a more robust means of maintaining the chain on the system. The Lee device provides a simplified structure for a bicycle transmission; however the device construction and constitutive parts differ when compared to the present invention. The Lee device is maintains a chain-driven system and a series of sprockets. The present invention substitutes all sprockets and chains for a discrete gear drive system, utilizing meshed gears, pinions and shafts to transmit power from the foot pedal crank to the rear wheel.

U.S. Published Patent Application No. 2009/0062057 to Fujiwara is another device that describes a covered bicycle transmission for a typical bicycle type, comprising a main shaft and plurality of gears to allow changes in output torque and speed as required. The device is mounted along the foot pedal crank and allows improved gear changing operation. Its structure is sufficiently simple and compact in size to allow incorporation onto existing bicycles using general-purpose parts to change speed ratios smoothly and effectively. While providing a means to seamlessly change gear ratios, this device falls short of describing the present invention, which provides a new type of bicycle with a completely internal gear train and power delivery means to a preferably hubless wheel. The present invention further provides a means of changing gears by operably translating a plurality of drive axles radially inward or outward from a main drive gear and a final drive gear, allowing high and low speed adjustments without requiring a plurality of aligned gears that operate independently.

U.S. Pat. No. 3,861,715 to Mendoza describes a direct transmission system for a bicycle that eliminates the use of a chain and sprocket drive system. A cylindrical axle connects to conical gears that drive the rear wheel, providing an enclosed assembly that reduces interferences with road debris, articles of clothing and further eliminates chain grease dispersion onto a rider's clothes. The Mendoza patent eliminates a chain driven transmission for a bicycle, but is limited in its ability to provide adequate gear ratios for widespread use and acceptance. The device is simplistic, but fails to achieve the level of sophistication required by modern bicyclists for improved use in all situations.

U.S. Pat. No. 5,316,327 to Bell describes a similarly chainless bicycle, comprising a crank hanger assembly that houses drive gears connected to the pedal arms. Support tubes connect the rear wheel to the pedal gear box, housing a drive shaft that transmits power from the pedals to the rear wheel. A bevel gear is provided on each end of the drive shaft to allow rotation of the shaft and torque transmission between the pedals and a rear wheel box. Similar to the Mendoza patent, this direct drive transmission eliminates the use of an exposed chain and sprocket system; however it lacks the ability to provide several speed ratios to the user. Its design and construction are simplistic, limiting its use when compared to the present invention. The present invention provides a direct drive system utilizing a plurality of gearing mechanisms, control rods and drive shafts that provide a user with a seamless transition from a standard, multi-speed bike to a direct drive, multi-speed bike with improved features and obvious advantages.

U.S. Pat. No. 5,419,619 to Lew describes a hubless wheel for a vehicle that improves weight and aerodynamic performance over a standard hub and spoke wheel. The wheel comprises a stationary inner loop that is coupled to the vehicle, while a rotatable outer loop concentrically mounted the inner loop. Bearings are provided between the inner and outer loop, while the outer loop is circumferentially mounted with a ground engaging tire tread. The present invention provides a similar hubless wheel in its construction; however the present invention contemplates its use in conjunction with a direct drive transmission that employs a gear pitch radially provided along the wheel. The direct drive transmission distributes power to the wheel through a meshed pair of beveled gear and the radial gear pitch along the rotating wheel. Its construction differs from the Lew patent, although both provide a hubless wheel with weight and aerodynamic advantages over traditional bicycle and vehicle wheels.

The present invention provides a new bicycle structure and associated mechanical drive system to allow all drive mechanisms to be internal to a central frame. A drivetrain of gears, pinions, bevel gears, drive axles and bushing provide means to transmit motive power from a user to the rear wheel. The wheels themselves are preferably hubless wheels, utilizing a rotating wheel member in connection with a stationary member via bearings. The front and rear wheels are separable from the frame itself, while all user controls are input through linkages provided within the handlebar stem. The drivetrain allows selection of different gear ratios, including high and low adjustment. The present invention substantially diverges in design elements from the prior art and consequently it is clear that there is a need in the art for an improvement to existing bicycle devices. In this regard the instant invention substantially fulfills these needs.

SUMMARY OF THE INVENTION

In view of the foregoing disadvantages inherent in the known types of bicycles now present in the prior art, the present invention provides a new bicycle with an internal, direct drivetrain, hubless and separable wheels and internal user controls wherein the same can be utilized for providing convenience for the user when riding a bicycle for pleasure, sport or transportation.

It is therefore an object of the present invention to provide a new and improved bicycle device that has all advantages of the prior art and none of the disadvantages.

Another object of the present invention to provide a direct drive bicycle transmission that eliminates use of a chain and sprocket mechanism. The drivetrain is mountable within an internal volume of a bicycle frame, and incorporates a drive gear, a plurality of disk gears, connecting rods and gear rods for selectively connecting to the drive gear and a disk gear for choosing different speed ratios. The assembly provides a robust transmission of torque and speed from the pedal crank to the rear wheel.

Another object of the present invention is to provide a bicycle with hubless wheels. The front and rear wheel of the present invention are hubless, wherein a tire tread is rotated around a stationary hub using a plurality of roller bearings or ball bearing devices. Motive power is provided to the rear wheel via the drivetrain, which directly rotates a gear rack around the rotating hub perimeter.

Another object of the present invention is to provide controls for selecting speed ratios and brake application using a handlebar stem device that displaces several bearing rings about a handle bar rod device. The rings connect to the two gear rods and the brake calipers.

Another object of the present invention is to provide a bicycle with front and rear wheel assemblies that are removable from a central frame via latches and quick disconnects for improved storage and transport of the device.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
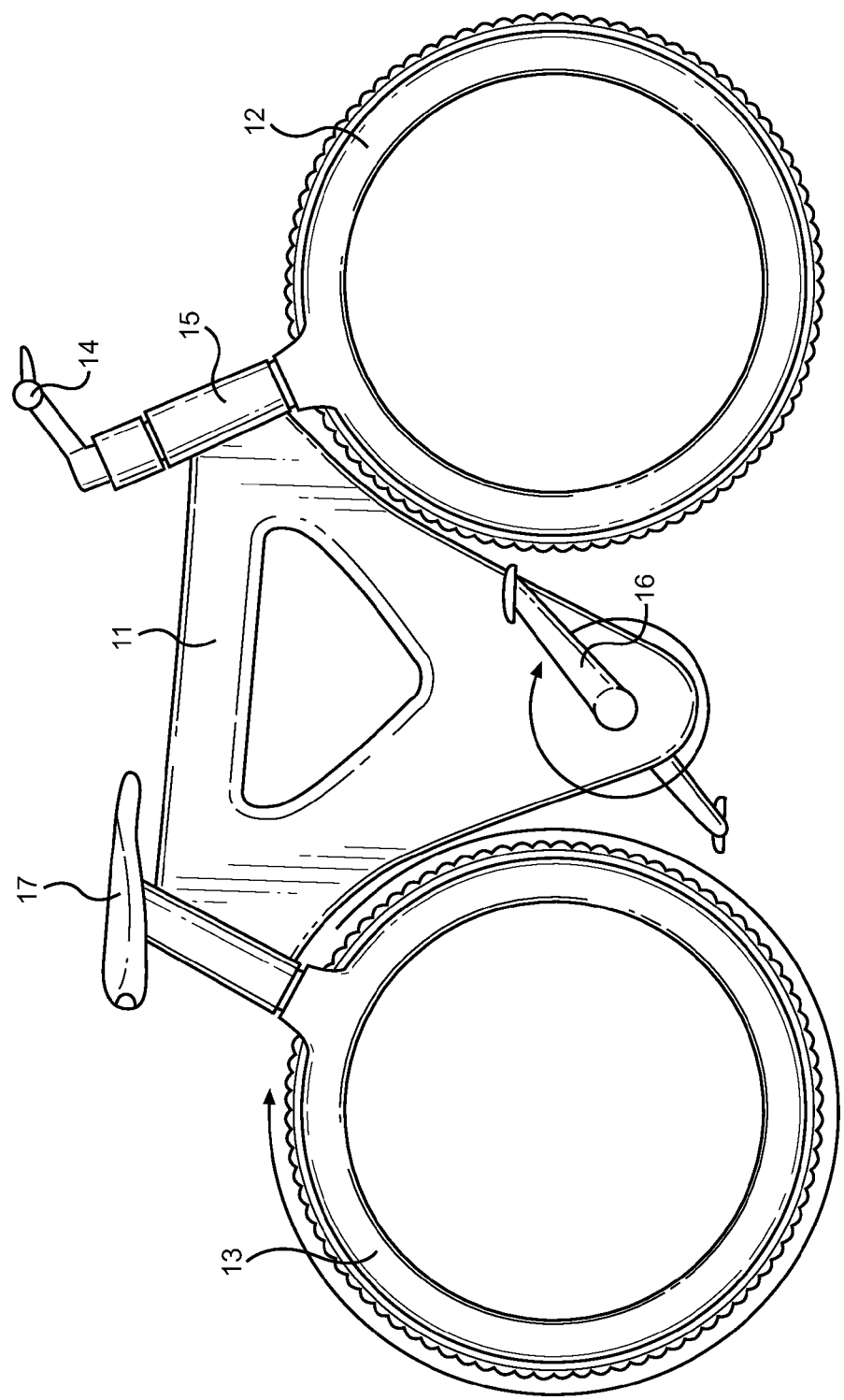
FIG. 1 shows a side view of the present invention, wherein central frame provides housing for an internal drivetrain that transmits torque and speed to the rear wheel, along with hubless wheels and controls mounted in the handlebar stem.

Referring now to FIG. 1, there is shown a side view of the present invention wherein a bicycle device is provided with a frame 11 section, a forward and a rear hubless wheel 12 and 13, a handle bar 14 with associated controls mounted within the handle bar stem 15, as well as a seat 17 for the user to sit while riding. The frame 11 comprises a hollow structure that provides housing for the bicycle drivetrain, transmitting torque and speed from a user crank pedal 16 to the rear wheel 13. The drivetrain is a direct drive transmission, utilizing a plurality of gears, rods and pinions to transmit the pedal motion into rotation of the rear wheel. Gear reduction and speed ratio is controlled by the user through the handle bar 14 controls, which connect to controls within the handlebar stem 15. These controls manipulate a plurality of internal gear rods and brake calipers to control the speed ratio between the foot pedal 16 and the rear wheel 13, and also application of the brakes, respectively. The design of the bicycle provides a sleek, aerodynamic structure that avoids any external mechanisms that are prone to spread grease and debris, incur foreign object damage or entangle with a user's clothing while in use. The frame may further provide a central cut-out for reduced weight and improved aesthetics.

The front 12 and rear 13 wheels are separable from the central frame 11, providing a collapsible structure that improves storage and transportation. The connections between the frame 11 and the wheels allow detachment while not in use, and secure connection while riding. The drivetrain separates from the rear wheel 13 along the back of the frame 11, while the hubs of both wheels detach using a latch mechanism. It is preferred that this operation be possible without external or specialized tools, allowing one to separate the sections of the bicycle after riding with ease.

Figure 2:
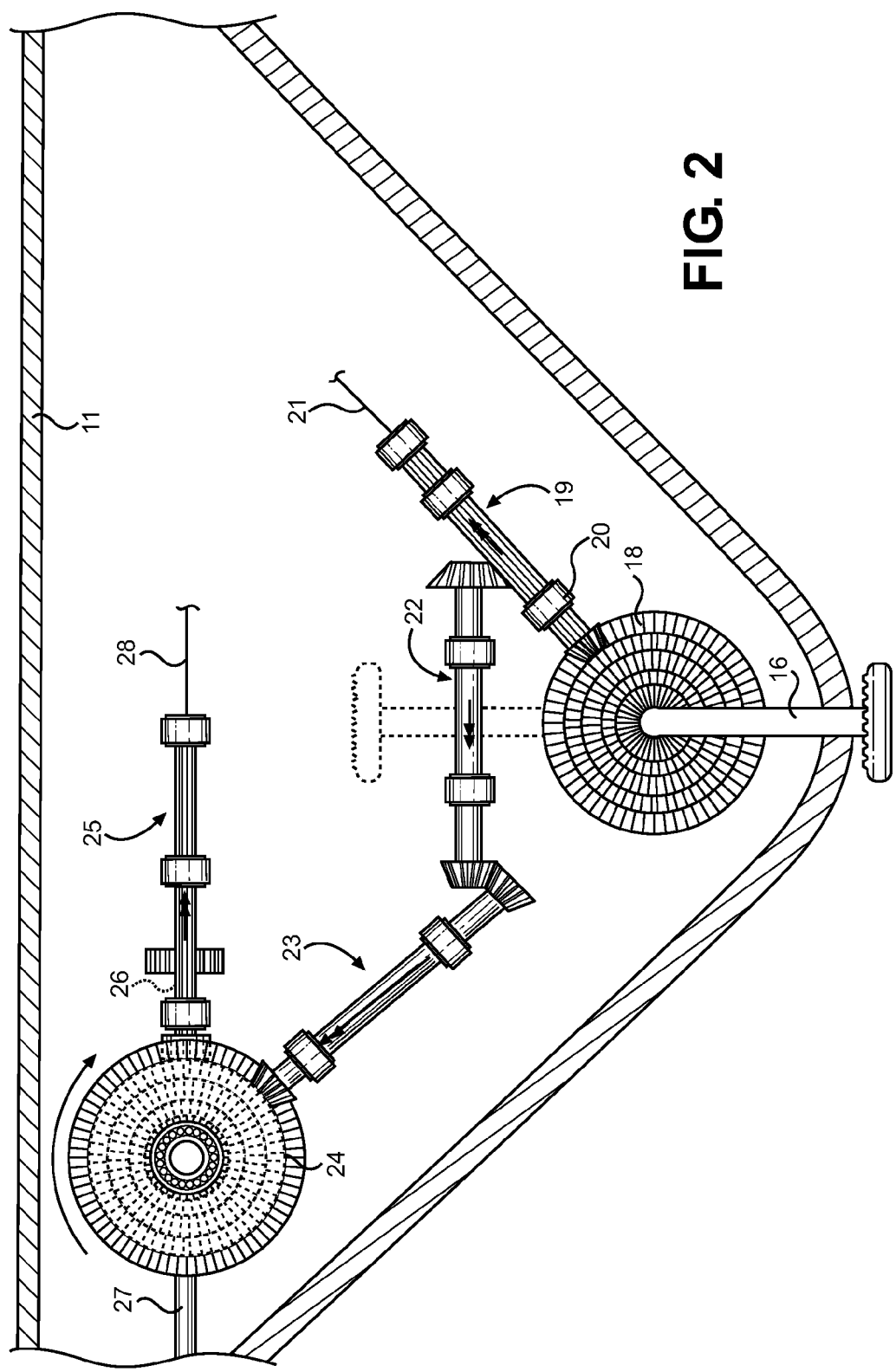
FIG. 2 shows an internal view of the present invention drivetrain, wherein a plurality of gears are housed within the bicycle frame.

Referring now to FIG. 2, there is shown a side view of the present invention drivetrain mounted within the frame 11 of the bicycle. An internal drive gear 18 is driven by user pedal 16 input. Rotation of the drive gear 18 rotates a first threaded gear rod 19, which is mated to the drive gear 18. The drive gear 18 has several rows of delimited gear pitches annularly situated about its first surface. The first gear rod 19 mates to a specific pitch that corresponds to a specific speed ratio, and can be adjusted by translating radially with respect to the drive gear 18 to update which pitch delimitation it is meshed with. Adjustment of the first gear rod 19 is accomplished by a control wire 21 that changes the position of the gear rod 19. The control wire 21 routes through the frame 11 to the handlebar stem 15.

The gear rod 19 employs gear splines along its length, to which is mounted a first connecting rod 22. The connecting rod 22 transfers rotation to a second connecting rod 23, which transfers the same to a first disk gear 24. The first disk gear 24 employs an asymmetric gear pitch on its opposing sides. The first side connects to the second connecting rod 23, providing only a single, outer set of splines to receive input from. The second side of the disk gear 24 is similar to the drive gear 18, wherein a plurality of gear pitch ratios is provided moving radially outward from its center of rotation. A second gear rod 25 connects to this second side of the disk gear 24, providing a second set of gear ratios to choose from, in a similar manner as the drive gear 18 and the first gear rod 19. A second control wire 28 controls the position of the second gear rod 25 with respect to the first disk gear 24. The second gear rod 25 also employs splines along its length, allowing linear displacement of the rod and continual connection with a third connecting rod 26. The third connecting rod mates to a second gear disk, mounted parallel to the first gear disk 24, transmitting power to a drive shaft 27 that extends out of the frame 11 and towards the rear wheel 13.

Figure 3:
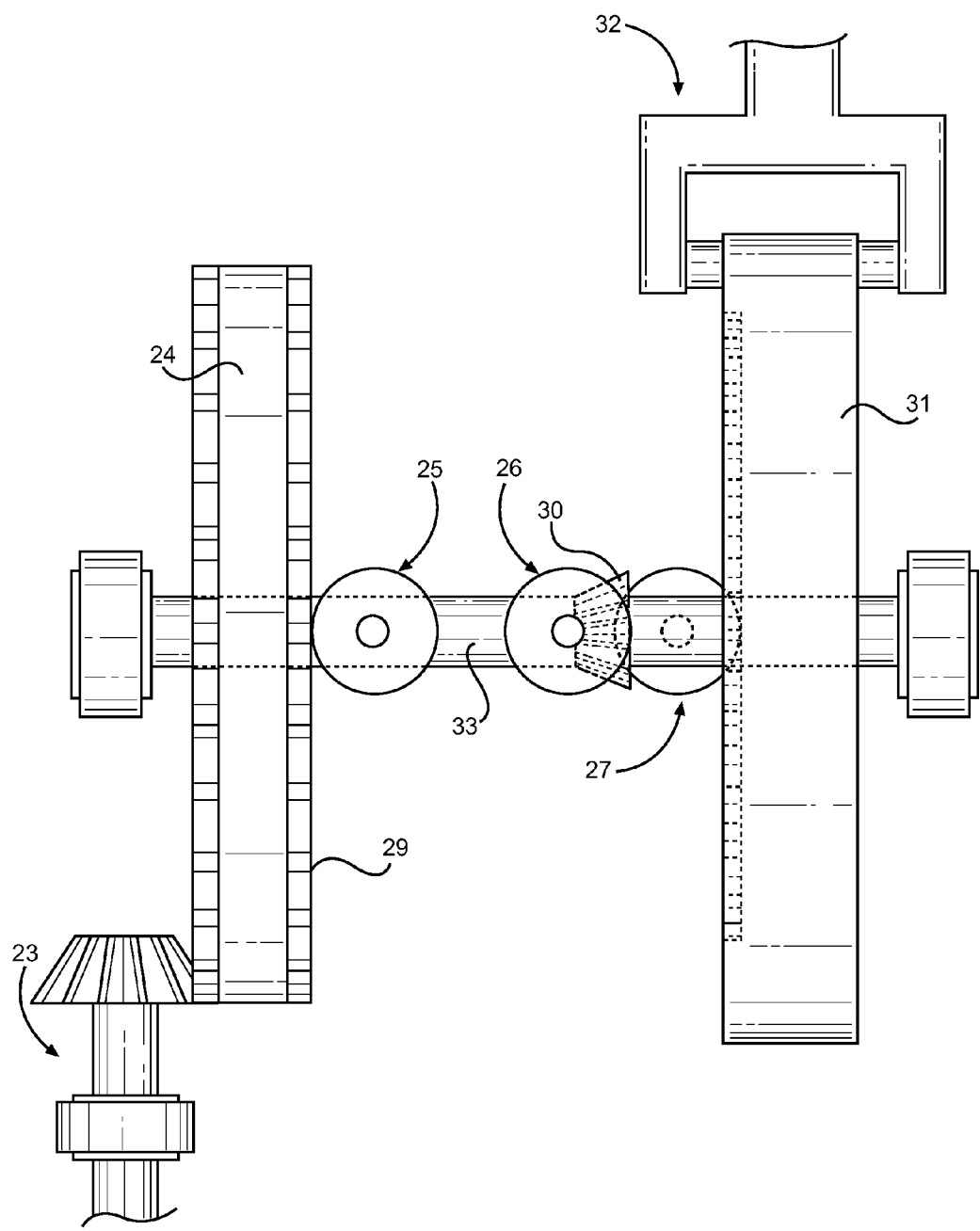
FIG. 3 shows a frontal view of the parallel mounted disk gears, second gear rod, input rod and output rod for transmission of speed and torque to the rear wheel.

Referring now to FIG. 3, there is shown a frontal view of the first 24 and second 31 disk gears aligned in a parallel configuration. Each disk is mounted to an axle rod 33 that spans the centerline of each and is mounted to bearings along the frame. Each disk can spin independently of each other. The first disk gear 24 receives input from the second connecting rod 23, which mates to the disk gear first side. The second gear rod 25 mates to the second side of the disk gear 29, which employs a similar spline structure as the drive gear. Different gear pitches are provided on the disk gear 24 second side 29 to allow different output speeds to the second gear rod 25, depending where the gear rod 25 is connected, radially along the first disk gear 24.

The second gear rod 25 connects to a third connecting rod 26, which provides motive input for the second disk gear 31. The third connecting rod 26 mates to a bevel gear 30 attached to the second disk gear 31, which rotates the gear about its central axis. Output from the second disk gear 31 is provided by a mated drive shaft 27 that sends power towards the rear wheel. Braking of this assembly is provided by a brake caliper 32 mounted on the periphery of the second disk gear 31. Application of the caliper causes brake pads to bear against the second disk gear 31 to reduce its momentum and slow its rotation.

Figure 4:
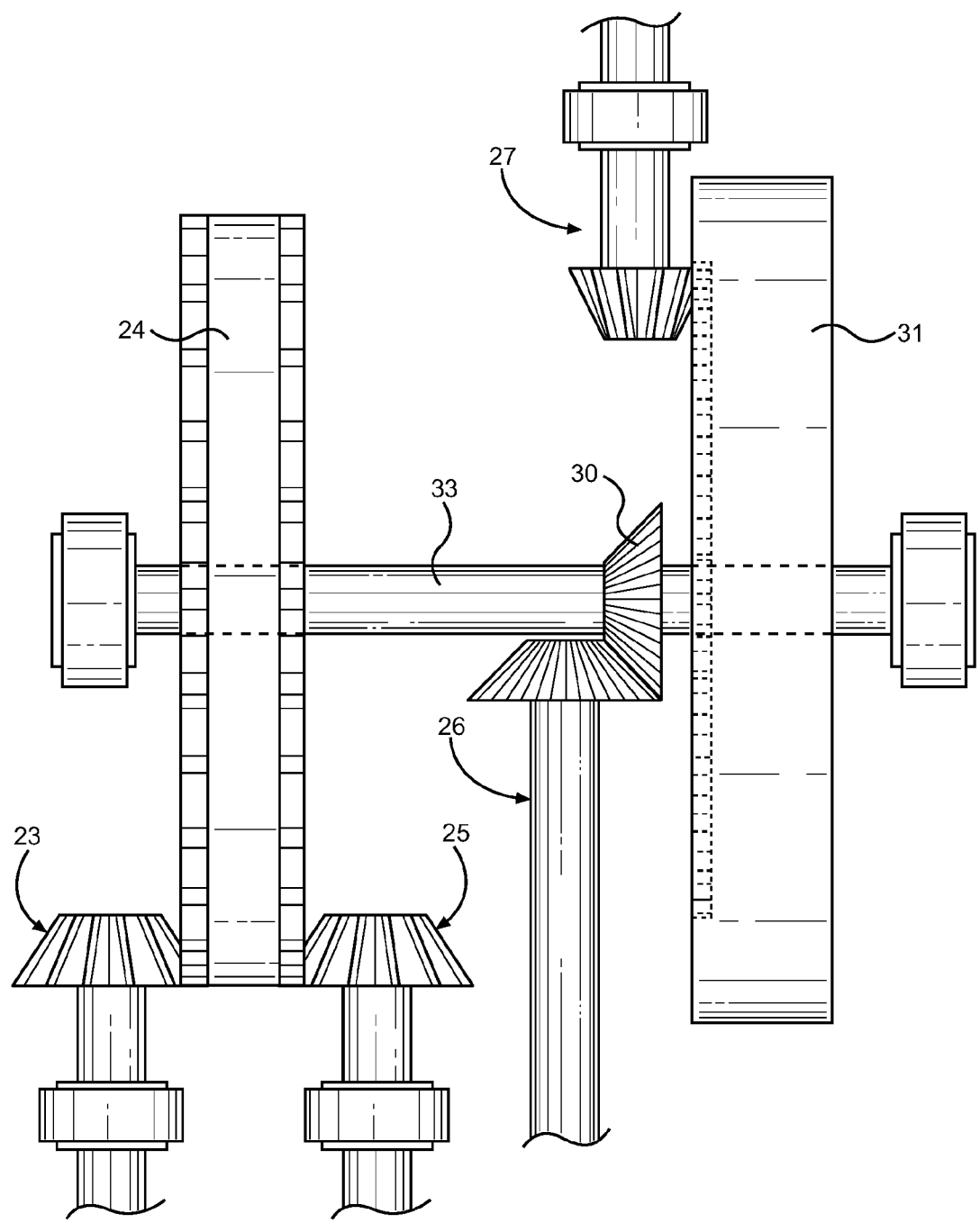
FIG. 4 shows an overheard view of the parallel mounted disk gears, second gear rod, input rod and output rod for transmission of speed and torque to the rear wheel.

Referring now to FIG. 4, there is shown an overhead view of the parallel mounted disk gears 24 and 31, the second gear rod 25, second connecting rod 23 and drive shaft 27 for transmission of speed and torque to the rear wheel 13. In this view, the layout of the disk gears is more clearly shown, along with the position of the associated inputs, gearing mechanisms and output. The second connecting rod 23 provides input to this system, rotating the first disk gear 24, which in turn is connected to the second gear rod 25. The gear rod 24 transfers rotation to a third connecting rod 26, which mates to a bevel gear 30, connected to the second disk gear 31 and concentrically mounted to or along side of the axle rod 33 spanning the two disk gears. Output from this system is provided by the connection of the second disk gear 31 to a drive shaft 27, which transmits power towards the rear of the bicycle and turns the rear wheel 13.

Figure 5:
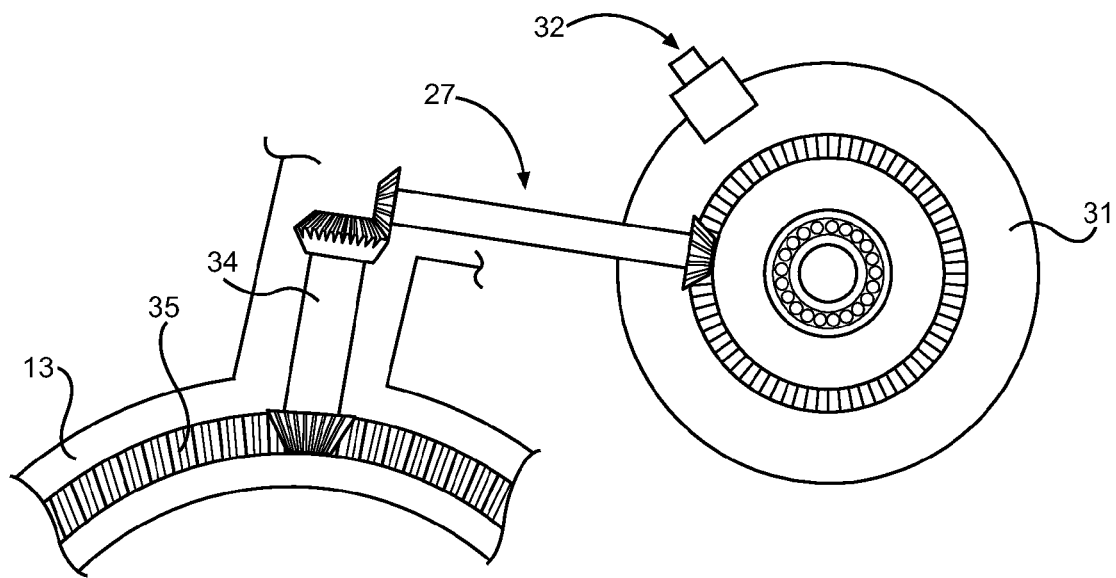
FIG. 5 shows the connection between the drivetrain and the rear wheel, as an output rod connects to splines on the rotating wheel hub.

Referring now to FIG. 5, there is shown a view of the connection between the drivetrain and the rear wheel 13, as an output drive shaft 27 connects to a final drive connecting rod 34, which connects to splines 35 on the rotating wheel hub. The second disk gear 31 provides power input for the drive shaft 27, while the brake caliper 32 is mounted on the disk gear 31 for brake application and control of output speed to the wheel 13. The system is designed to incorporate a free transmission of power, meaning the motion of the rear wheel is not directly coupled to the rotation of the pedal crank. The user is able to apply a forward cranking motion, which transfers energy to the wheel through the transmission, but the wheel is capable of coasting, along with components in the transmission, without requiring the pedal to maintain the same rotational velocity. The pedal crank can therefore remain stationary while the rear wheel is turning, similar to what is customary on modern bicycles.

Figure 6:
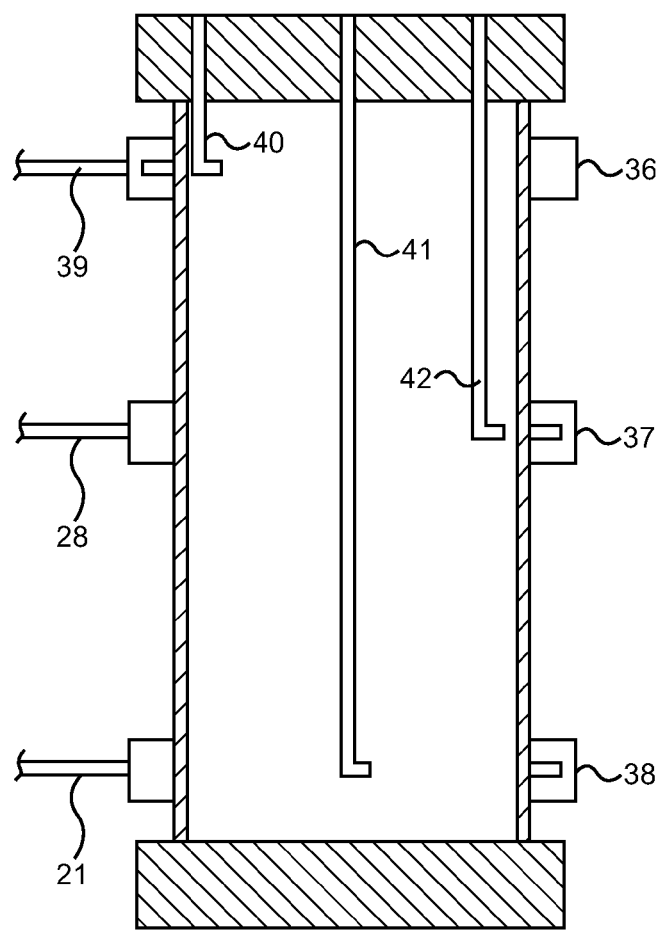
FIG. 6 shows a side view of the handle bar stem-mounted control input device, wherein speed ratio and brake application are controlled by the user

Referring now to FIG. 6, there is shown a side view of the handle bar stem-mounted control input device, wherein speed ratio and brake application are controlled by the user. Speed ratio is controlled by changing the linear position of one of the two gear rods, which change their position relative to the drive gear and first disk gear. Since rotational speed is a function of gear teeth pitch and the radius of the gear, changing where the gear rod mate to those two structures will change the rotational speed of the gear rods themselves, as they receive motive input from where they mount to the drive gear and first disk gear. The handlebar stem controls, as shown in FIG. 6, illustrates an embodiment of these inputs that change the position of control wires that communicate input to the gear rods and the front and rear brake calipers. L-rods 40, 41 and 42 provide positional input for three radially-mounted bearing rings 36, 37, and 38 that slide along the outer surface of the handlebar stem control rod. Their position on the rod changes the position on the control wires 39, 28 and 21, respectively. These positions manipulate the position of the gear rods and brake caliper actuation.

Figure 7:
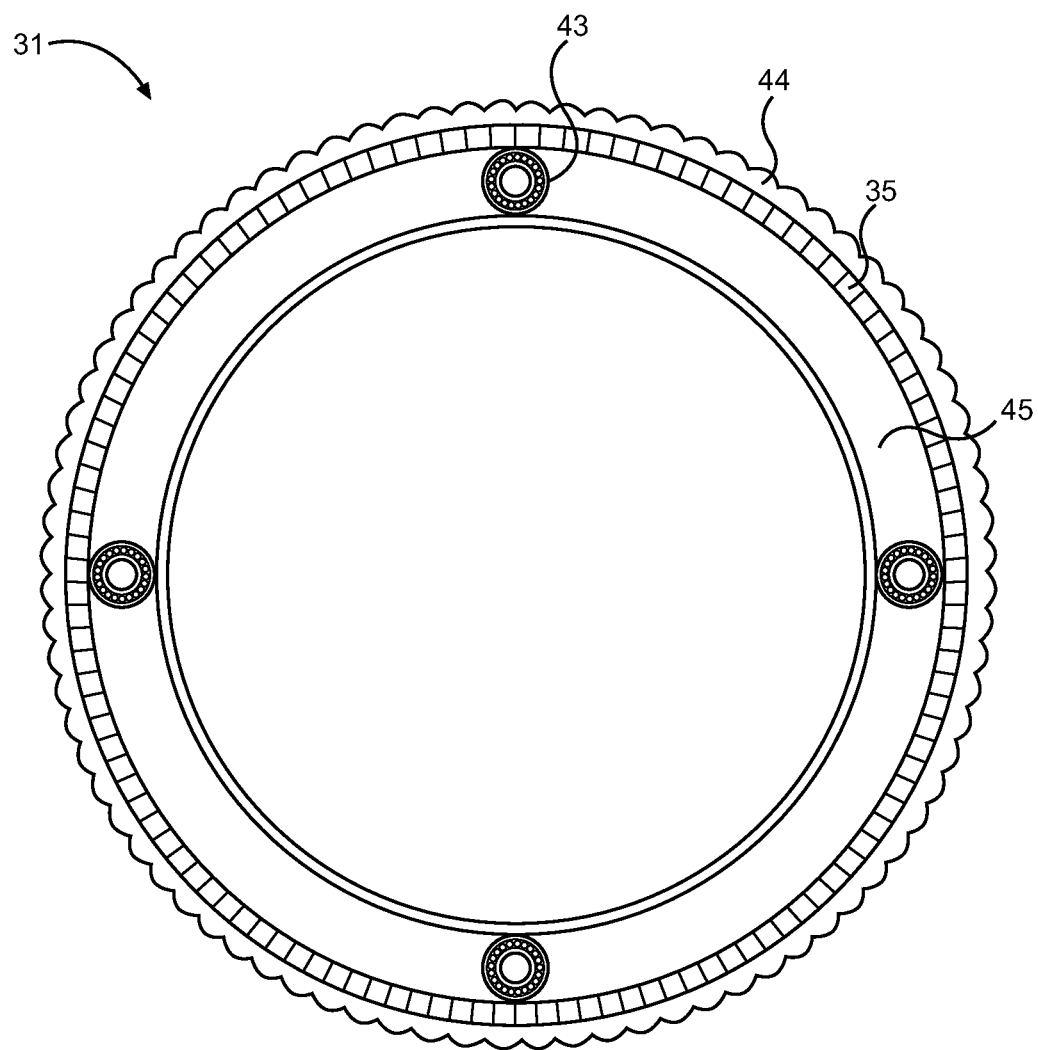
FIG. 7 shows a side view of the rear hubless wheel.

Referring now to FIG. 7, there is shown a side view of the rear hubless wheel 13. The wheel operates without a centrally mounted hub or spoke to support a circular hub frame 45. The hub frame 45 connects directly to a stem region that connects to the frame 11 of the bicycle. A plurality of bearing mechanisms allows an outer, rotating hub 35 to rotate about the station hub frame 45. The rotating hub 35 is driven by splines that connect to the drive shaft through the drive connecting rod. Along the outer periphery of the rotating hub 35 is a tire 44 for contact with a ground surface. The tire may be tubeless, tube-filled or optionally airless, depending on user preferences and intended uses.

The present invention provides a sleek, modern design for a bicycle that incorporates an internally-mounted, direct drive transmission, hubless wheels and a structure that is detachable from its wheels. The construction of the handlebar stem control allows the L-rods to connect to the control wires continuously as the handlebar is rotated. Therefore, the handlebar and front wheel can be rotated 360 degrees without interfering with the bicycle control lines or clashing with the frame structure. This allows free movement of the front handlebar without consideration for controls or interferences.

The drivetrain is mounted within the frame, and is supported using a series of bushings that allow rotation of associated rods and shafts utilizing ball or roller bearing devices. The bearings and associated bushings are placed in particular locations to support the position and loads introduced into the system, allowing the system to retain continuity between shafts, gears and gear teeth while undergoing operation loads and vibration. The gears themselves may include any necessary configuration to transmit power from one component to the next in an effective manner and similar to that shown in the accompanying figures. The gears may comprise straight tooth splines, bevel gears, helical gears or the like.

In an alternate embodiment, present invention may be used in a motorized configuration wherein the user pedal crank input is replaced with an electric motor or small internal combustion engine that drives the transmission assembly. While it is desired to retain the manually driven bicycle aspects of the present invention, alternate forms of motive power input are contemplated. Materials contemplated for use with the present invention include any material commonly found on bicycle frames and gearing mechanisms. These include metallic based structures to composite frames for lightweight and rigidity.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle device with a direct-drive transmission, comprising:
   a frame with an internal volume, a front and rear wheel, a handle bar device and handle bar stem, a seat and a crank input;
   said direct-drive transmission housed within said frame interior volume;
   said crank input rotates a drive gear, said drive gear rotates a first gear rod, said first gear rod rotates a first connecting rod, which rotates a second connecting rod;
   said second connecting rod rotates a first disk gear, mounted in parallel to a second disk gear and independently mounted to an axle rod;
   said first disk gear rotates a second gear rod, which rotates a third connecting rod, said third connecting rod rotating said second disk gear;
   a drive shaft is rotated by said second disk gear and drives said rear wheel through a rotating final drive connecting rod.

2. A device as in claim 1, wherein said rear wheel further comprises a rotating hub comprising gear splines, driven by said final drive connecting rod.

3. A device as in claim 1, wherein said front a rear wheel further comprise hubless wheels with a hollow central region, a rotating outer hub, a stationary inner hub, bearings between said rotating and stationary hubs, and an outer tire perimeter.

4. A device as in claim 3, wherein said tire is an airless, solid tire.

5. A device as in claim 1, wherein said first and second gear rods further comprise gear splines along their length and said drive gear and said first disk gear employ a plurality of spline pitch delimitations.

6. A device as in claim 1, wherein said speed ratio between crank input and rear wheel output speed is determined by a mating location of said gear rods and said drive gear and said first disk gear.

7. A device as in claim 1, further comprising:
   a stem-mounted control input device, which controls the position of said first and second gear rods and brake caliper control of said bicycle;
   said control input device comprising a shaft with three radially mounted bearing rings and L-rods that connect to said bearing rings and update said ring locations along said shaft;
   control wires connect said bearing rings to said gear rods and said brake calipers.

8. A device as in claim 1, wherein said crank input is powered by an electric motor.

9. A device as in claim 1, wherein said crank input is powered by an internal combustion engine.

10. A device as in claim 1, wherein said crank input is manually powered by a user through foot pedals.

11. A bicycle device with a direct-drive transmission, comprising:
   a frame with an internal volume, a front and rear wheel, a handle bar device and handle bar stem, a seat and a crank input;
   said direct-drive transmission housed within said frame interior volume;
   said crank input rotates a drive gear, said drive gear rotates a first gear rod, said first gear rod rotates a first connecting rod, which rotates a second connecting rod;
   said second connecting rod rotates a first disk gear, mounted in parallel to a second disk gear and independently mounted to an axle rod;
   said first disk gear rotates a second gear rod, which rotates a third connecting rod, said third connecting rod rotating said second disk gear;
   a drive shaft is rotated by said second disk gear and drives said rear wheel through a rotating final drive connecting rod;

said rear wheel comprises a rotating hub of gear splines, driven by said final drive connecting rod;

said front a rear wheel further comprise hubless wheels with a hollow central region, a rotating outer hub, a stationary inner hub, bearings between said rotating and stationary hubs, and an outer tire perimeter.

12. A device as in claim 11, wherein said first and second gear rods further comprise gear splines along their length and said drive gear and said first disk gear employ a plurality of spline pitch delimitations.

13. A device as in claim 11, wherein said speed ratio between crank input and rear wheel output speed is determined by a mating location of said gear rods and said drive gear and said first disk gear.

14. A device as in claim 11, further comprising:
 a stem-mounted control input device, which controls the position of said first and second gear rods and brake caliper control of said bicycle;
 said control input device comprising a shaft with three radially mounted bearing rings and L-rods that connect to said bearing rings and update said ring locations along said shaft;
 control wires connect said bearing rings to said gear rods and said brake calipers.

15. A device as in claim 11, wherein said crank input is powered by an electric motor.

16. A device as in claim 11, wherein said crank input is powered by an internal combustion engine.

17. A device as in claim 11, wherein said crank input is manually powered by a user through foot pedals.

\* \* \* \* \*